(12) United States Patent
West et al.

(10) Patent No.: US 8,422,192 B2
(45) Date of Patent: Apr. 16, 2013

(54) FUEL PIPE JOINT ON AN AIRCRAFT

(75) Inventors: Colin John West, Pontypridd South Wales (GB); David Alistair Sutton, Bristol (GB)

(73) Assignee: Airbus Operations Limited, Bristol (GB)

(*) Notice: Subject to any disclaimer, the term of this patent is extended or adjusted under 35 U.S.C. 154(b) by 78 days.

(21) Appl. No.: 13/193,959

(22) Filed: Jul. 29, 2011

(65) Prior Publication Data

US 2013/0027835 A1    Jan. 31, 2013

(51) Int. Cl.
*H05F 3/00* (2006.01)

(52) U.S. Cl.
USPC .......................................................... 361/218

(58) Field of Classification Search .................... 361/218
See application file for complete search history.

(56) References Cited

U.S. PATENT DOCUMENTS

| | | |
|---|---|---|
| 2008/0078880 A1 | 4/2008 | Petit |
| 2009/0256352 A1* | 10/2009 | Petit et al. ................ 285/123.15 |
| 2010/0226061 A1 | 9/2010 | Sutton et al. |
| 2010/0226062 A1 | 9/2010 | West et al. |
| 2010/0226063 A1 | 9/2010 | West et al. |

* cited by examiner

*Primary Examiner* — Dharti Patel
(74) *Attorney, Agent, or Firm* — Lowe Hauptman Ham & Berner, LLP

(57) ABSTRACT

A joint with a first component; a second component; and an electrical assembly which provides an electrical pathway between the first and second components with an electrical resistance between 100 kΩ and 10 MΩ. The electrical assembly comprises a bonding lead; and a pair of connection assemblies each connecting the bonding lead to a respective one of the components. Each connection assembly comprises: a fastener with a shaft which passes through a hole in the component and a hole in the bonding lead, the hole in the bonding lead passing between an inner face of the bonding lead which faces towards the component and an outer face of the bonding lead which faces away from the component, and a washer which is carried by the shaft of the fastener and engages the component and the inner face of the bonding lead. Each washer provides the path of least electrical resistance between the bonding lead and a respective one of the components, each said path having an electrical resistance between 50 kΩ and 5 MΩ.

14 Claims, 5 Drawing Sheets

FUEL PIPE JOINT ON AN AIRCRAFT

FIELD OF THE INVENTION

The present invention relates to a joint incorporating a bonding lead.

BACKGROUND OF THE INVENTION

There is a risk in aircraft fuel systems of a build up of static electricity on one component in comparison to another component to which it is connected. In the prior art, a so-called bonding lead is connected to each side of the joint in order to electrically connect the components and prevent static build up. An example of such a bonding lead is described in the prior art section of U.S. application Ser. No. 2008/0078880.

U.S. application Ser. No. 2010/0226063 discloses bonding leads which are formed from a material with a relatively low conductivity. This results in a relatively low flow of current which reduces the risk of sparking in the event of a lightning strike. However this requires the electrical conductivity of the material forming the bonding lead to be changed depending on the overall length of the bonding lead. This makes it difficult to provide bonding leads in different lengths which nevertheless lie within the desired resistance range.

A further bonding lead arrangement is described in U.S. application Ser. No. 2010/0226062. In this case the bonding lead comprises a conductive core and a sheath which covers a substantial length of the core and has a lower electrical conductivity than the core. The path of least electrical resistance between the first component and the core of the bonding lead comprises the sheath.

SUMMARY OF THE INVENTION

A first aspect of the invention provides a joint according to claim 1. A second aspect of the invention provides a method according to claim 12.

Typically the electrical resistance of the bonding lead is much lower than that of each washer, typically by a factor of more than 100, so the total resistance of the assembly remains substantially the same regardless of the length of the bonding lead.

The shaft of the fastener may engage a wall of the hole in the bonding lead. However this may result in a low resistance electrical path via the shaft which makes the overall resistance of the assembly too low. Therefore more preferably each washer has a sleeve which surrounds the shaft and is received in the hole of the component and an annular flange which extends outwardly from the sleeve, wherein the flange of the washer engages the component and the inner face of the bonding lead and provides said path of least electrical resistance. This arrangement ensures that there is no engagement between the bonding lead and the shaft of the fastener, making it easier to control the electrical conductivity of the connection assembly since this will depend only on the material and geometry of the washer flange.

Optionally each connection assembly may further comprise a second washer with a sleeve which surrounds the shaft and is received in the hole of the component and an annular flange which extends outwardly from the sleeve, wherein the flange of the second washer engages the outer face of the bonding lead. The sleeve of the second washer may engage the sleeve of the first washer, or there may be a gap between them.

Preferably each connection assembly further comprises a nut which is carried by the shaft and can be tightened to compress the washer between the component and the inner face of the bonding lead. The nut may engage the second washer, and the second washer may be resiliently compressed by the nut.

The bonding lead may dissipate electrostatic charge across the joint and/or conduct lightning current across the joint.

One or both of the components in the joint may be a fuel pipe, a hydraulic pipe, an air pipe, a wall of a fuel tank, an access panel in a wall of a fuel tank, or any other part of an aircraft which is in contact with fuel when in use (in liquid or vapour form) or has the potential of doing so.

The electrical assembly provides an electrical pathway between the first and second components with a relatively high electrical resistance—between 100 kΩ and 10 MΩ, preferably between 200 kΩ and 1 MΩ, and most preferably between 200 kΩ and 500 kΩ.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
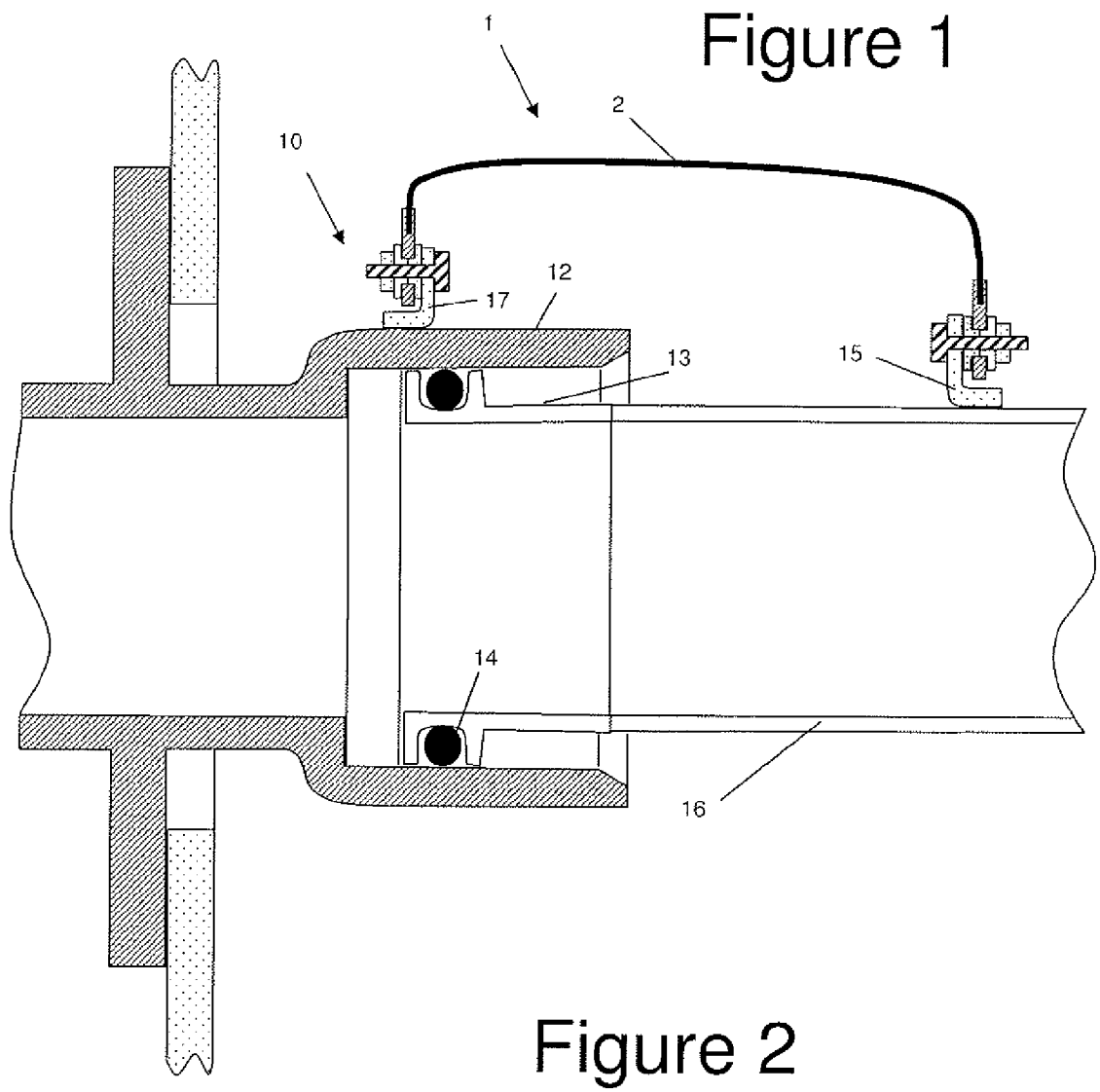
FIG. 1 is a sectional view of a joint according to an embodiment of the invention.

FIG. 1 shows a fuel pipe joint 10 on an aircraft. The joint comprises a socket 12 in which a pipe end fitting 13 is located, an O-ring seal 14 sealing the contact between the socket and the pipe end fitting, and a connection tab 15 welded to the fuel pipe 16 connected to the pipe end fitting 13. A further connection tab 17 is machined on the socket 12 and a bonding lead 2 is arranged between the two connection tabs 15, 17 to provide an electrical pathway connecting one side of the joint to the other.

The bonding lead 2 forms part of a electrical assembly 1 which forms an electrical connection between the connection tabs 15, 17 with a relatively high electrical resistance—between 100 kΩ and 10 MΩ, or more typically between 200 kΩ and 500 kΩ.

Figure 2:
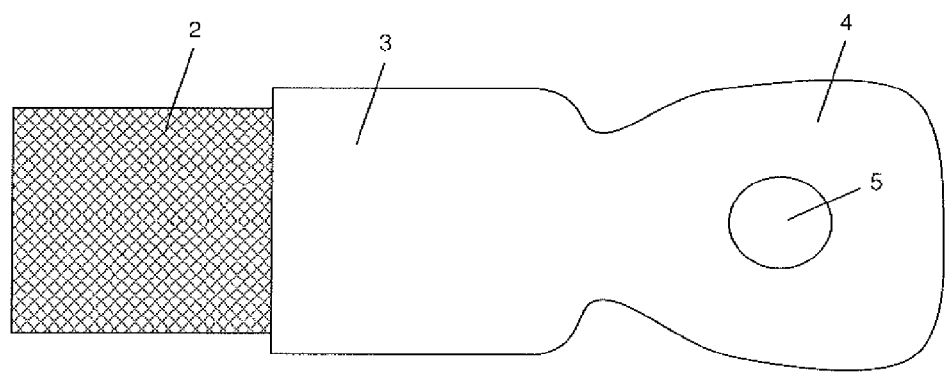
FIG. 2 is a plan view of one end of a bonding lead.

FIG. 2 shows one end of the bonding lead 2. The other end is identical. The bonding lead comprises a braided copper cable 2, terminated at each end by a conductive metal connector shown in FIG. 2. The conductive connector comprises a sleeve 3 which is crimped to the cable 2, and a head 4 with a hole 5.

Figure 3:
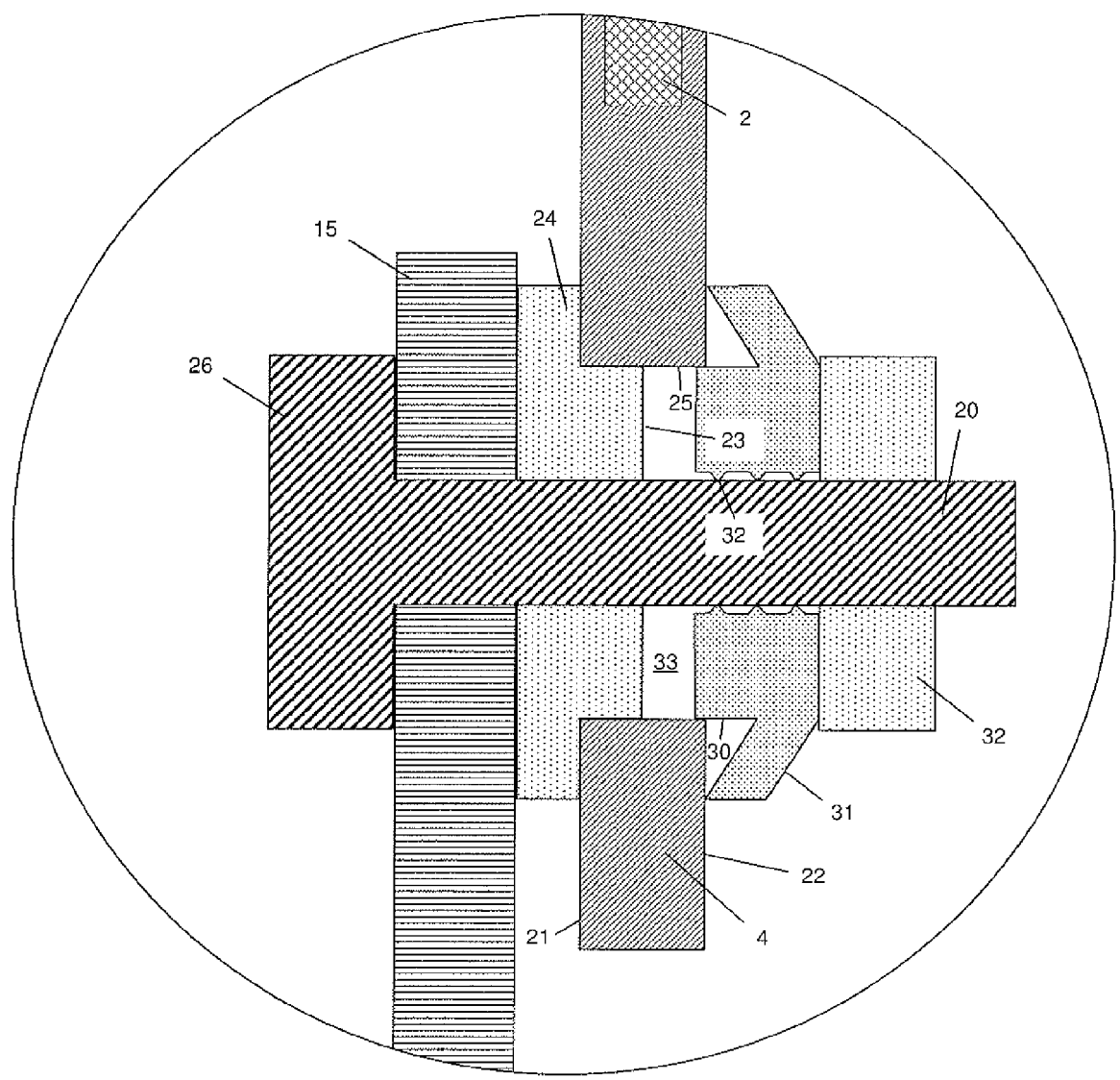
FIG. 3 is a sectional view showing a connection assembly at one end of the bonding lead before the nut has been tightened.
Figure 4:
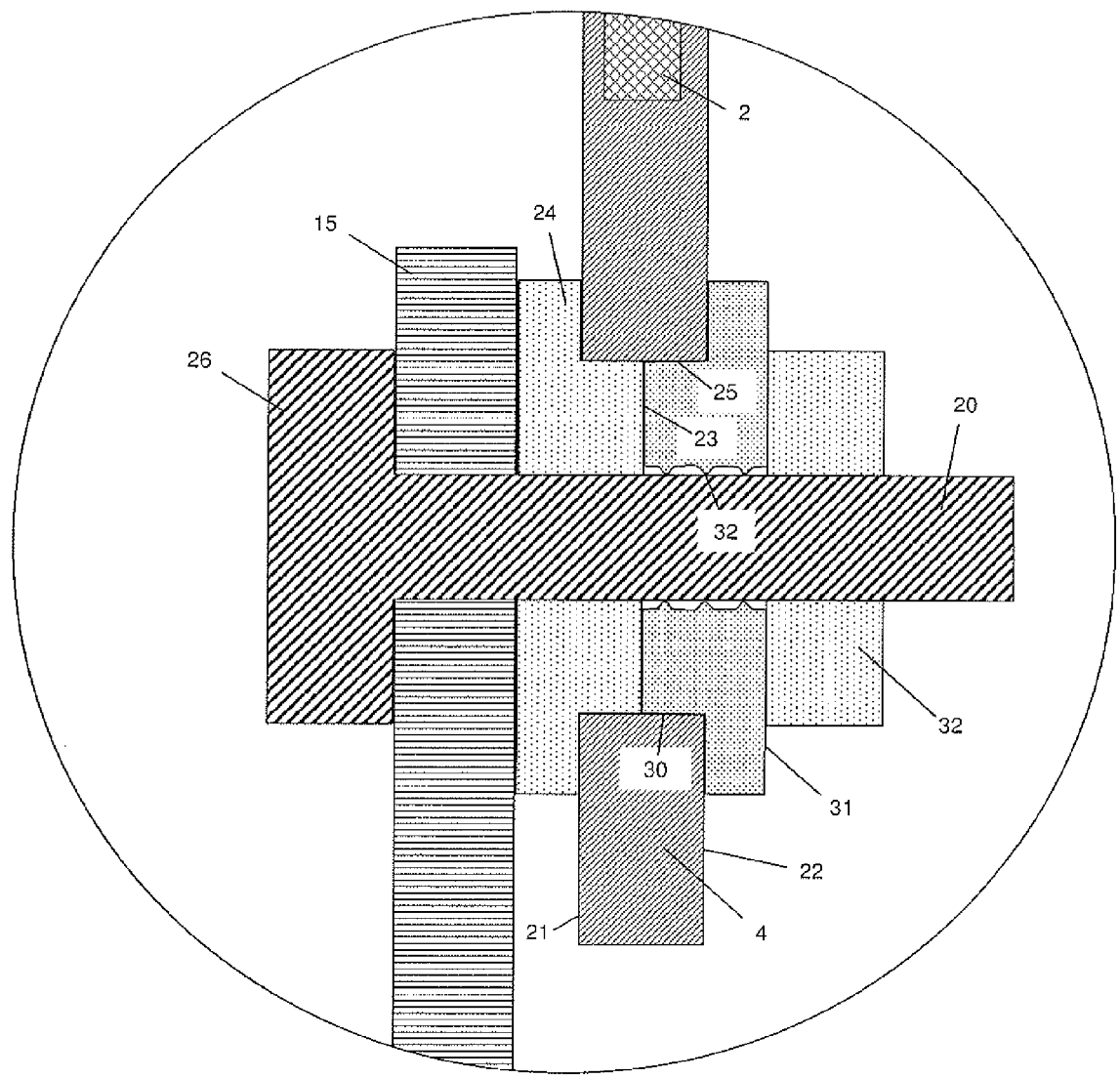
FIG. 4 is a sectional view showing a connection assembly at one end of the bonding lead after the nut has been tightened.

A connection assembly shown in FIGS. 3 and 4 connects the bonding lead to the tab 15. A similar connection arrangement is provided between the bonding lead and the other tab 17. A fastener with a threaded shaft 20 passes through a hole in the tab 15 and the hole 5 in the head 4 of the conductive connector. The hole 5 passes between an inner face 21 of the head 4 which faces towards the tab 15 and an outer face 22 of the head 4 which faces away from the tab 15.

A first washer is carried by the shaft 20 and engages the tab 15 and the inner face 21 of the head 4. The washer has a sleeve 23 which surrounds the shaft 20 within the hole 5 and an annular flange 24 which extends radially from the sleeve. The sleeve 23 engages the shaft 20 and optionally may also engage a wall 25 of the hole 5 in the head 4. The flange 24 engages the tab 15 and the inner face 21 of the head 4.

A second washer is provided on the other side, with a sleeve 30 which surrounds the shaft 20 and an annular flange 31 which extends outwardly from the sleeve 30 and towards the face 22 at an acute angle. The sleeve 30 has three annular sealing rings 32 which engage the shaft 20. Optionally the sleeve 23 of the first washer may also have similar sealing ridges.

A threaded nut 32 is carried by the shaft 20 and can be tightened to compress the various parts of the connection assembly between the nut 32 and a head 26 of the bolt. FIG. 3 shows the assembly before the nut 32 has been tightened. In its un-tightened state there is a small gap 33 between the sleeve 23 of the first washer and the sleeve 30 of the second washer. As the nut 32 is tightened, the angled flange 31 bends back resiliently, the sleeve 30 moves into the hole 5, and the gap 33 is progressively closed until the sleeve 30 engages the sleeve 23 as shown in FIG. 4. As the nut 32 is tightened further, the sleeve 30 is compressed against the sleeve 23. Closing the gap 33 in this way prevents corrosive fluids from entering the gap 33. In the compressed state shown in FIG. 4 the flange 24 of the first washer is compressed between the tab 15 and the inner face 21 of the head 4 to form a robust electrical connection between them.

In an alternative embodiment (not shown) the first washer may have a resilient angled flange, instead of (or addition to) the second washer.

The sleeve 30 of the second washer engages the shaft 20, the wall 25 of the hole in the bonding lead, and the end face of the sleeve 23 of the first washer. The flange 31 of the second washer engages the outer face 22 of the head 4.

The shaft 20 is formed from a non-conductive material such as Nylon. The first washer 23, 24 is formed from a semiconducting material such as a fluorosilicone loaded with carbon nanotubes or carbon black, a metal alloy such as nickel chromium, or a ceramic-metal composite. Thus the flange 24 of the first washer acts an electrical resistor, providing a path of least electrical resistance between the head 4 of the bonding lead and the tab 15. The material and geometry of the flange 24 are selected so that this path has an electrical resistance between 50 k$\Omega$ and 5 M$\Omega$.

The same arrangement is present at the other end of the cable, so the path of least resistance between the tabs 15 and 17 runs along the length of the lead 1 and through the flanges of the first washers at both ends. As a result substantially all of the current conducted by the bonding lead is carried along a relatively high resistance electrical pathway which comprises a washer at both ends in series with the cable 2.

If the cable 2 breaks, resulting in one of the halves of the cable 2 making intermittent contact with the fuel tank wall, then the risk of sparking is mitigated by the relatively high resistance of the washer flange 24.

The second washer 30, 31 may be formed from a lower conductivity material than the first washer 23, 24, or from the same material.

Figure 5:
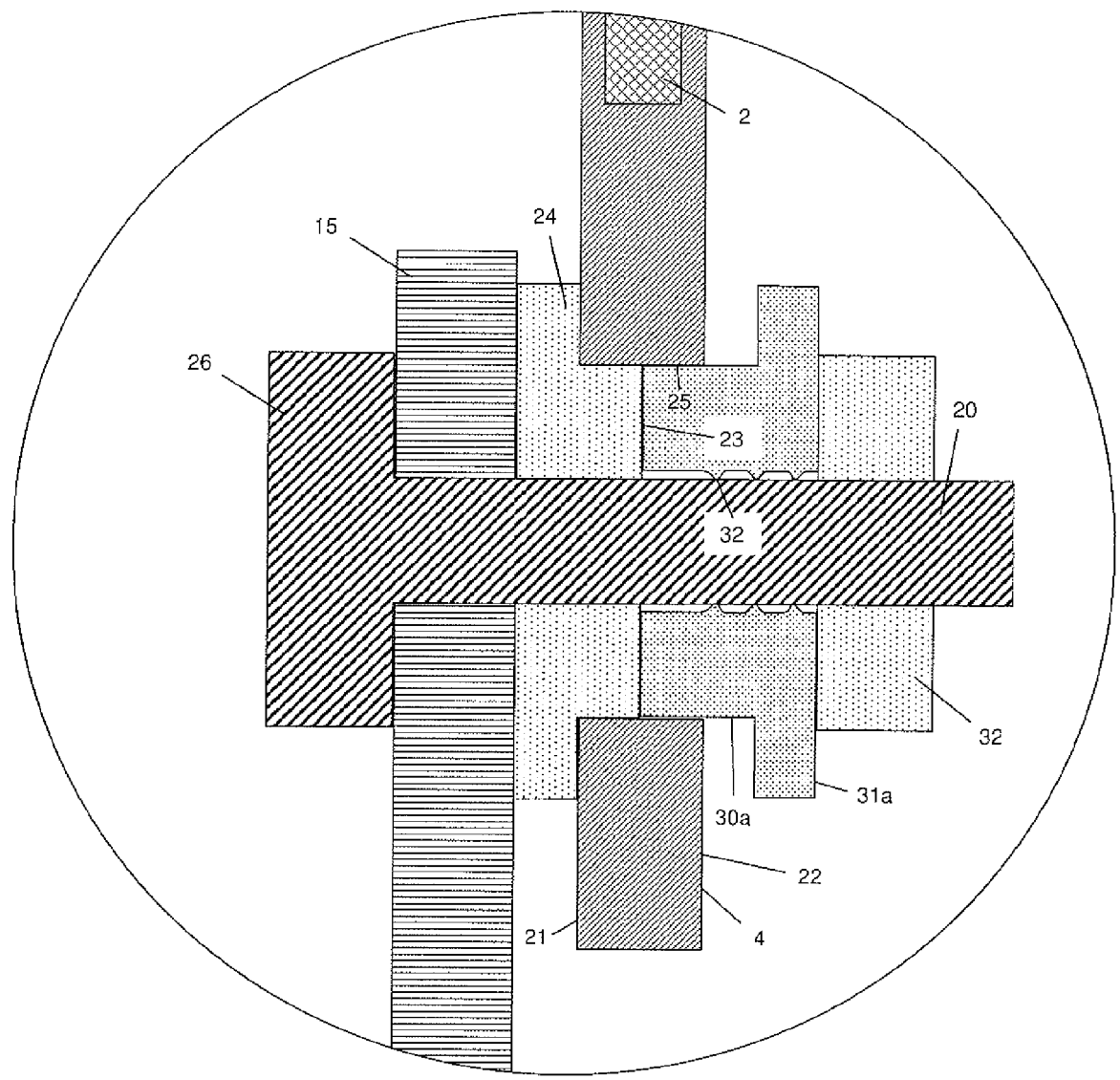
FIG. 5 is a sectional view showing a connection assembly according to a second embodiment before the nut has been tightened.
Figure 6:
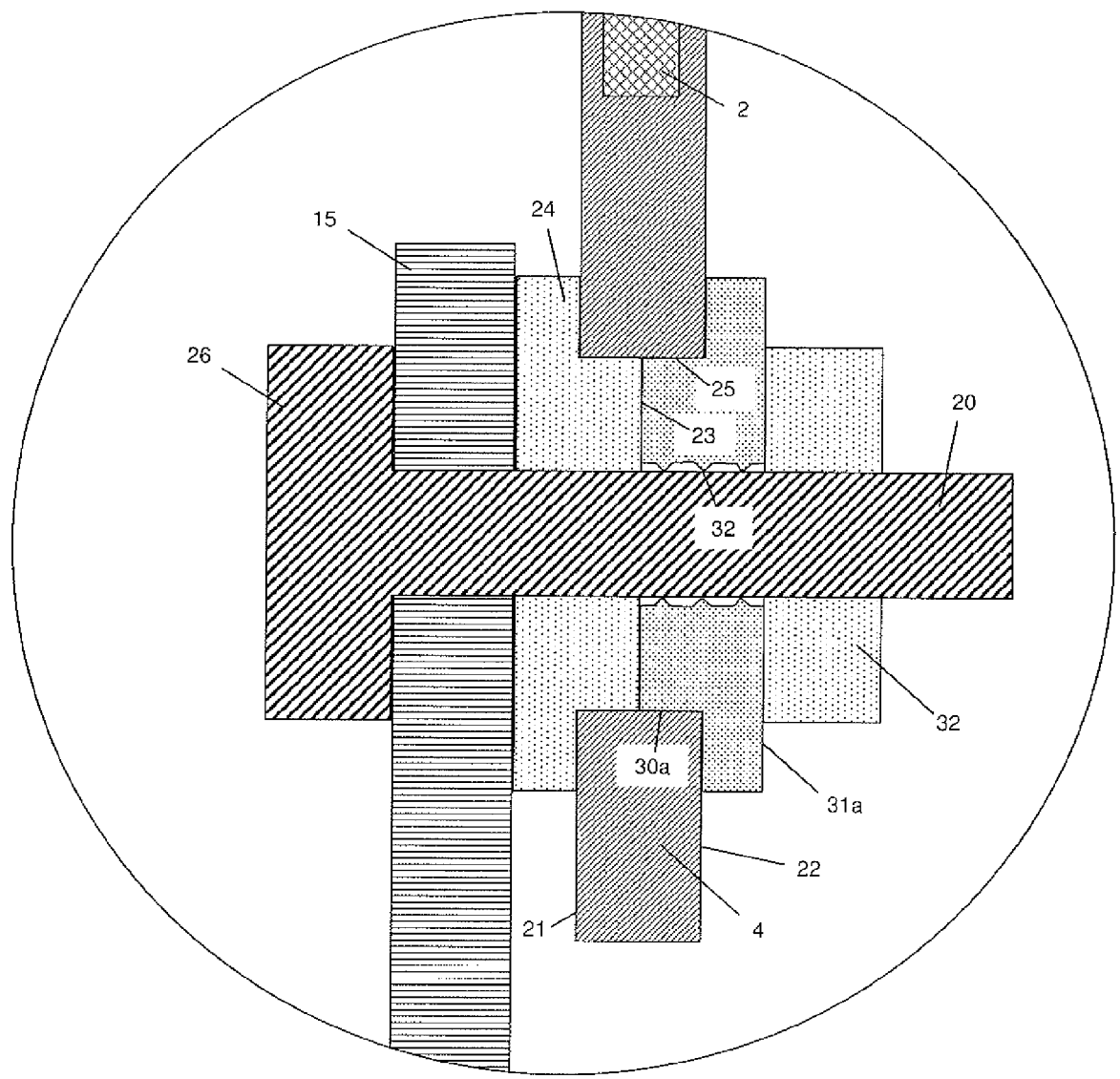
FIG. 6 is a sectional view showing the connection assembly according to a second embodiment after the nut has been tightened.

FIGS. 5 and 6 show an alternative connection assembly, where equivalent components are given the same reference number. FIG. 5 shows the assembly before the nut 32 has been tightened. The second washer 30a, 31a is formed from a resilient material such as an insulating rubber. The sleeve 30a is oversized as shown in FIG. 5 so that as the nut 32 is tightened, the sleeve 30a is compressed until the flange 31a engages the wall 22 as shown in FIG. 6. As the nut 32 is tightened further, the flange 31a is compressed against the wall 22. Thus the arrangement of FIGS. 5 and 6 provide an alternative way of ensuring that there is no gap 33 between the washer sleeves, whilst the nut compresses the flange 31a of the second washer and the sleeve 30a of the second washer.

Although the invention has been described above with reference to one or more preferred embodiments, it will be appreciated that various changes or modifications may be made without departing from the scope of the invention as defined in the appended claims.

The invention claimed is:

1. A joint comprising: a first component; a second component; and an electrical assembly which provides an electrical pathway between the first and second components with an electrical resistance between 100 k$\Omega$ and 10 M$\Omega$, the electrical assembly comprising a bonding lead; and a pair of connection assemblies each connecting the bonding lead to a respective one of the components, wherein each connection assembly comprises:
   a) a fastener with a shaft which passes through a hole in the component and a hole in the bonding lead, the hole in the bonding lead passing between an inner face of the bonding lead which faces towards the component and an outer face of the bonding lead which faces away from the component, and
   b) a washer which is carried by the shaft of the fastener and engages the component and the inner face of the bonding lead,
   wherein each washer provides a path of least electrical resistance between the bonding lead and a respective one of the components, each said path having an electrical resistance between 50 k$\Omega$ and 5 M$\Omega$.

2. The joint of claim 1 wherein each washer has a sleeve which surrounds the shaft and is received in the hole of the component and an annular flange which extends outwardly from the sleeve, and wherein the flange of the washer engages the component and the inner face of the bonding lead and provides said path of least electrical resistance.

3. The joint of claim 2 wherein each connection assembly further comprises a second washer with a sleeve which surrounds the shaft and is received in the hole of the component and an annular flange which extends outwardly from the sleeve, and wherein the flange of the second washer engages the outer face of the bonding lead.

4. The joint of claim 3 wherein the sleeve of the second washer engages the sleeve of the first washer.

5. The joint of claim 3 wherein the second washer is formed from a different material to the first washer.

6. The joint of claim 3 wherein the second washer has one or more annular sealing ridges which engage the shaft.

7. The joint of claim 3 wherein the nut compresses the flange of the second washer and the sleeve of the second washer.

8. The joint of claim 1 wherein each connection assembly further comprises a nut which is carried by the shaft and can be tightened to compress the washer between the component and the inner face of the bonding lead.

9. The joint of claim 1 wherein the first and second components are parts of an aircraft.

10. The joint of claim 1 wherein the electrical assembly provides an electrical pathway between the first and second components with an electrical resistance higher than 200 k$\Omega$.

11. The joint of claim 1 wherein the electrical assembly provides an electrical pathway between the first and second components with an electrical resistance lower than 1 M$\Omega$.

12. The joint of claim 1 wherein the electrical resistance of the bonding lead is lower than that of each washer by a factor of more than 100.

13. A method of conducting current between a first component and a second component, the method comprising: installing an electrical assembly which provides an electrical pathway between the first and second components with an electrical resistance between 100 k$\Omega$ and 10 M$\Omega$, the electrical assembly comprising a bonding lead; and a pair of connection assemblies each connecting the bonding lead to a respective one of the components, wherein each connection assembly comprises:
- a) a fastener with a shaft which passes through a hole in the component and a hole in the bonding lead, the hole in the bonding lead passing between an inner face of the bonding lead which faces towards the component and an outer face of the bonding lead which faces away from the component, and
- b) a washer which is carried by the shaft of the fastener and engages the component and the inner face of the bonding lead, the method further comprising conducting current between the first component and the second component via the bonding lead and the pair of washers, wherein each washer provides a path of least electrical resistance between the bonding lead and a respective one of the components, each said path having an electrical resistance between 50 $\Omega$ and 5 M$\Omega$.

14. The method of claim 13 wherein the first and second components are parts of an aircraft.

* * * * *